United States Patent [19]
Schimmel

[11] Patent Number: 6,105,113
[45] Date of Patent: Aug. 15, 2000

[54] SYSTEM AND METHOD FOR MAINTAINING TRANSLATION LOOK-ASIDE BUFFER (TLB) CONSISTENCY

[75] Inventor: Curt F. Schimmel, San Ramon, Calif.

[73] Assignee: Silicon Graphics, Inc., Mountain View, Calif.

[21] Appl. No.: 08/915,912

[22] Filed: Aug. 21, 1997

[51] Int. Cl.⁷ ..................................................... G06F 12/08
[52] U.S. Cl. ........................... 711/146; 711/144; 711/145; 711/206
[58] Field of Search ................................... 711/146, 144, 711/145, 206

[56] References Cited

U.S. PATENT DOCUMENTS

| | | | |
|---|---|---|---|
| 5,339,399 | 8/1994 | Lee et al. | 711/146 |
| 5,428,761 | 6/1995 | Herlihy et al. | 711/130 |
| 5,437,017 | 7/1995 | Moore et al. | 395/200.43 |
| 5,463,750 | 10/1995 | Sachs | 711/169 |
| 5,737,756 | 4/1998 | White et al. | 711/142 |
| 5,752,274 | 5/1998 | Garibay, Jr. et al. | 711/206 |
| 5,761,734 | 6/1998 | Pfeffer et al. | 711/164 |
| 5,765,022 | 6/1998 | Kaiser et al. | 710/22 |

OTHER PUBLICATIONS

Hennessy and Patterson, *Computer Architecture: A Quantitative Approach*, 2nd Ed., pp. ix–xii, 372–457 and 634–760, Morgan and Kaufman Publishing, USA 1996.

Goodheart, B. and James Cox, *The Magic Garden Explained*, Prentice Hall, 1994, pp. ix–xix and 69–457 and 634–760, Morgan and Kaufman Publishing, USA 1996.

Schimmel, *UNIX Systems for Modern Architectures: Symmetric Multiprocessing and Caching for Kernel Programmers*, Addison–Wesley Professional Computing Series, 1994, pp. vii–xiv, 5–8 and 287–340.

Tomasevic, M. and V. Milutinovic, *The Cache Coherence Problem in Shared–Memory Multiprocessors: Hardware Solution*, IEEE Computer Society Press, 1993.

*Primary Examiner*—Hiep T. Nguyen
*Attorney, Agent, or Firm*—Sterne, Kessler, Goldstein & Fox P.L.L.C.

[57] ABSTRACT

A system and method for maintaining consistency between translational look-aside buffers (TLB) and page tables. A TLB has a TLB table for storing a list of virtual memory address-to-physical memory address translations, or page table entries (PTES) and a hardware-based controller for invalidating a translation that is stored in the TLB table when a corresponding page table entry changes. The TLB table includes a virtual memory (VM) page tag and a page table entry address tag for indexing the list of translations The VM page tag can be searched for VM pages that are referenced by a process. If a referenced VM page is found, an associated physical address is retrieved for use by the processor. The TLB controller includes a snooping controller for snooping a cache-memory interconnect for activity that affects PTEs. The page table entry address tag can be searched by a search engine in the TLB controller for snooped page table entry addresses. The TLB controller includes an updating module for invalidating or updating translations associated with snooped page table entry addresses. Translations in TLBs are thus updated or invalidated through hardware when an operating system changes a PTE, without intervention by an operating system or other software.

21 Claims, 8 Drawing Sheets

UNI-PROCESSOR ENVIRONMENT

CENTRALIZED, SHARED MEMORY, SYMMETRIC MULTIPROCESSING (SMP) ENVIRONMENT

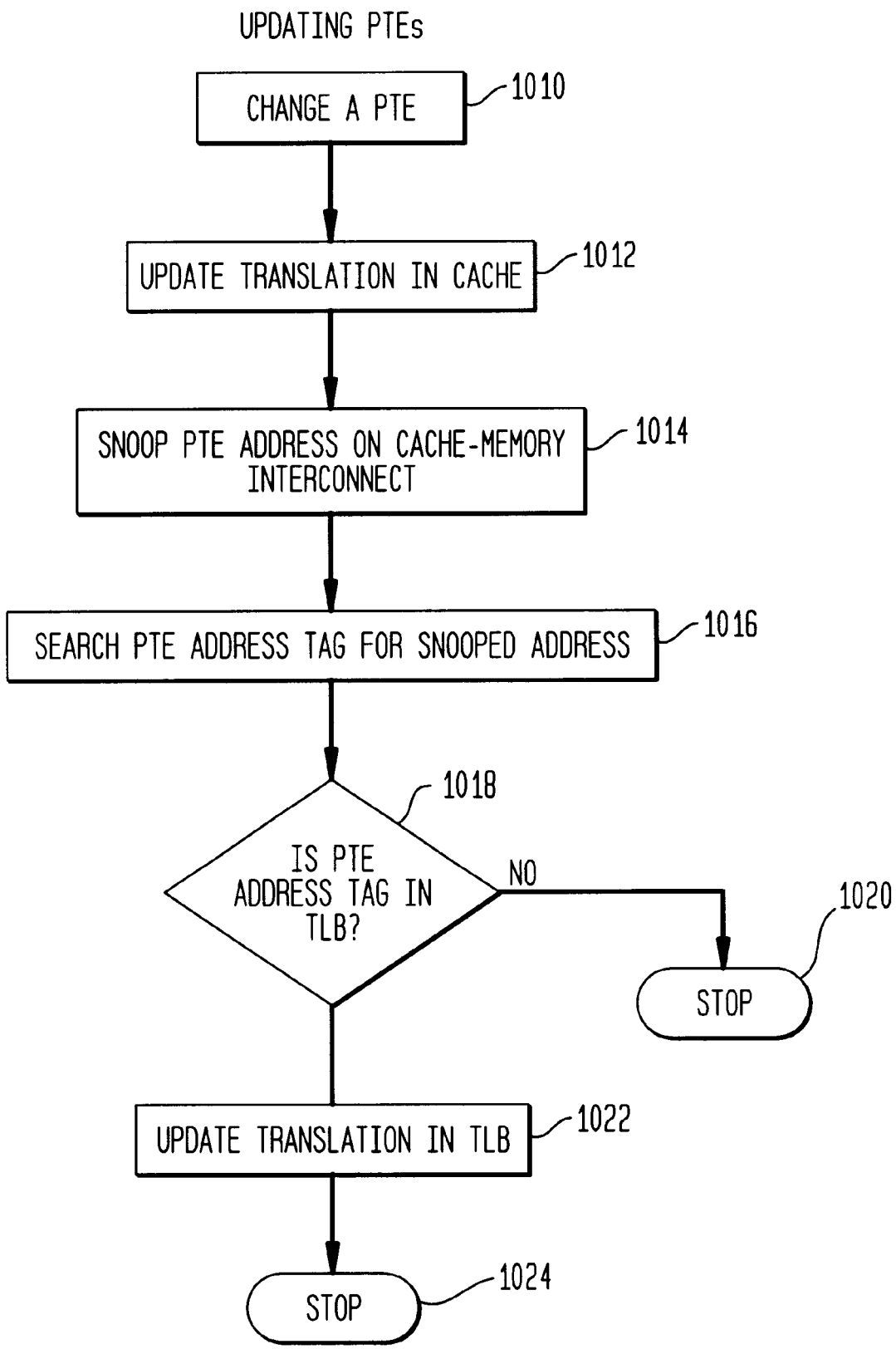

SYSTEM AND METHOD FOR MAINTAINING TRANSLATION LOOK-ASIDE BUFFER (TLB) CONSISTENCY

BACKGROUND OF THE INVENTION

1. Field of the Invention

The present invention relates to translational look-aside buffers that are used for storing virtual memory address-to-physical memory address translations for a processor.

2. Related Art

Computer systems, including uni-processor computer systems and multiprocessor computer systems, typically run multiple processes or threads at a time. Each process requires some amount of physical memory. Often, physical memory is limited and must be allocated among the different processes.

In order to allocate limited physical memory among multiple processes, computer systems employ virtual memory schemes. Virtual memory schemes divide physical memory into pages and allocate the pages to the different processes. Physical memory that is so allocated is referred to as mapped memory.

In a virtual memory scheme, each process that is allocated a block of physical memory is also provided with a set of translations for translating virtual addresses to assigned physical addresses of the allocated block. Each set of translations can be stored in, for example, a page table. A page table can be associated with a specific user or shared by multiple users. Alternatively, reverse page table techniques can be employed.

Page tables are commonly indexed by virtual page numbers and include a page table,entry (PTE) for each virtual page address. If a virtual page is stored in memory, a corresponding PTE includes a physical address of the page and control information such as a valid bit, permission bits, etc. The PTE for a page can be found by looking at an index that corresponds to the virtual address. Page tables can be implemented as sparse arrays and are typically stored in main memory.

When a process requests access to a virtual memory address, a page table that is associated with the process is searched for the requested virtual address. When the virtual address is found, the process can access the desired page using the physical address in the PTE that is associated with the virtual address.

Computer systems typically employ one or more levels of cache memory between main memory and each processor in order to reduce memory access time. Cache memories store data that is retrieved from main memory. Data that is retrieved by a processor must pass through the one or more levels of cache in order to get to the processor. Because caches tend to be small and physically close to the processor, sometimes located on-chip with the processor, cached data can generally be accessed much faster than data that is stored in main memory. Thus, caches are typically used to store data that needs to be repeatedly accessed by a processor, such as PTE translations.

In addition to caching translations, most processors employ an on-chip, translational look-aside buffer (TLB) for storing a number of most recently used, virtual memory address-to-physical memory address translations. When a processor retrieves a translation from main memory or from cache, it stores the translation in an associated TLB. The processor can retrieve a translation from the TLB faster than from the cache or from main memory. Because TLBs tend to be small, storing for example, forty eight translations, processors can overwrite least recently used translations in a TLB with more recently used translations.

When the processor needs a translation, it first looks to the TLB. If a translation exists in the TLB, the processor retrieves the physical address from the TLB and accesses the data using the physical address. If the translation does not exist in the TLB (i.e, a TLB "miss"), the processor looks to the cache or main memory. These operations can be performed with hardware, software, firmware or any combination thereof.

One problem that confronts both TLBs and caches is maintaining consistency of data that is stored in more than one location. For example, a PTE can be retrieved from main memory and stored in both a processor cache and a TLB. Later, an operating system can change or invalidate the PTE. For example, in a distributed shared memory (DSM) system, data that is stored in the mapped physical memory location can be migrated or moved to another physical location. As a result of the migration, the PTE is no longer valid because it stores the physical address of the data prior to the migration. Thus, the operating system updates the PTE to reflect the new physical location of the data. The copy of the PTE that is stored in the processor cache and the TLB, however, is no longer valid.

In order to prevent processors from retrieving invalid translations from caches and TLBs, invalid translations must be flagged with an invalid bit or have a valid bit turned off. Alternatively, invalid translations can be updated with current, valid translations.

Systems and methods for maintaining cache consistency, including hardware and software methods, are well known. Cache consistency hardware schemes, or protocols, are divided into two main types, directory protocols and snooping protocols. In directory protocols, the sharing status of memory is maintained in a centralized directory. In a distributed shared memory (DSM) system, the directory can be distributed. A centralized controller is responsible for maintaining consistency of shared data. Any time that data stored in a memory location is changed, a check is performed in the centralized directory to determine whether a copy of the data is stored in a cache. If so, each copy is either updated or invalidated. For example, copies of a PTE stored in one or more caches could be invalidated by sending an invalidation signal and a page table entry address directly to each cache that stores a copy of the PTE. Directory protocols are highly scalable and are preferred in large multi-processing systems.

In snooping protocols, no central directory is maintained. Instead, each cache is responsible for the consistency of its data. Actions involving shared memory are broadcast to all caches. Each cache includes snooping hardware for snooping the broadcasts and for determining whether a broadcast requires that some action be taken on the cache. For example, a PTE stored in a cache could be invalidated by broadcasting an invalidation signal and a PTE address. The address snooping hardware for each cache receives the broadcast and searches the associated cache for the PTE address. If the PTE address is found, the associated translation is invalidated or updated. Because of the broadcast requirement, snooping protocols are generally implemented in shared bus architectures. Since the number of broadcasts generally increases with increasing caches, snooping protocols are not very scalable.

Software cache coherence schemes rely on both operating system and application programmers to insure consistency. It is not always possible for programmers to predict process execution and interaction, however, limiting the effectiveness of software techniques.

Additional details of cache consistency schemes are provided in, for example: Schimmel, "*UNIX Systems for Modern Architectures, Symmetric Multiprocessing and Caching for Kernel Programmers*," pp.287–333, Addison Wesley, 1994; Hennessy and Patterson, *Computer Architecture A Quantitative Approach*, 2d Ed., pp. 655–693, Morgan Kaufmann, 1996; Tomasevic and Milutinovic, *The Cache Coherence Problem in Shared-Memory Multiprocessor: Hardware Solutions*, IEEE Computer Society Press, 1993; and *Cache Coherency Problem in Shared Memory Multiprocessors: Software Solutions*, edited by Milo Tomasevic and Veljko Milutinovic, Los Angeles, Calif., IEEE Computer Society Press, 1993, each of which is incorporated by reference herein.

In TLB consistency schemes, stale TLB entries are typically removed by broadcasting invalidation requests to all central processing units (CPUs) in a system via inter-CPU interrupts and then waiting for acknowledgments to come back from each CPU. This is almost universally performed with software. Few, if any systems, uses hardware. Interrupting the operating system or the CPU each time that a TLB entry needs to be invalidated, however, reduces the time that can be spent performing other tasks.

Alternatively, invalidation requests can be sent only to CPUs where the process has executed. In either situation, substantial communication and synchronization overhead is incurred. Moreover, operating systems can invalidate every entry in a TLB rather than just the stale entries. This results in additional TLB miss overhead for the entries that were valid.

What is needed is a hardware-based, system and method for updating a translational look-aside buffer when PTE in a cache is updated, that does not interrupt CPU processing or the operating system and does not invalidate valid TLB entries. A system and method for updating TLBs is needed which reduces communication and synchronization overhead.

SUMMARY OF THE INVENTION

The present invention is a system and method for maintaining consistency between translational look-aside buffers (TLBs) and page tables by combining cache consistency techniques with TLBs. The system includes a TLB having a TLB table for storing a list of virtual memory address-to-physical memory address translations or page table entries (PTEs). The TLB also includes a hardware-based controller for identifying and updating, or invalidating, PTEs that are stored in the TLB table when the page table entry is changed by an operating system.

The TLB table includes a virtual memory (VM) address tag and a PTE address tag for indexing the list of translations, or PTEs. The VM address tag can be searched for virtual memory address by the CPU. The after the word "The" and before the can retrieve translations, or PTEs, that are associated with virtual memory address. The PTE address tag can be searched by the TLB controller for PTE addresses that are changed by the operating system and updated in a cache. Updating can include replacing an invalid translation with a valid translation or invalidating a PTE.

In one embodiment, the TLB controller includes a snooping controller, a search engine and an updating module. The snooping controller snoops a cachememory interconnect for cache consistency data. Cache consistency data can be sent from a directory protocol cache consistency scheme or from a snooping protocol cache consistency scheme. The search engine searches the PTE address tag of the TLB table for PTE addresses that are snooped by the snooping controller. The updating module updates or invalidates PTEs, or translations, in the TLB table when the PTE is changed by the operating system.

In operation, when a CPU requires a physical memory address that is associated with a virtual memory address, the CPU first searches the virtual address tag of the TLB table. If a valid translation is not found in the TLB table, the translation is retrieved from a cache or from main memory and a copy of the translation is placed in the TLB table.

When a translation in a page table is changed or invalidated by the operating system, an update or invalidate signal is sent over the cache-memory interconnect to one or more caches, along with the PTE address. In a directorybased protocol, the update or invalidate signal and PTE address are sent only to caches that have copies of the PTE. In a snooping protocol, the update or invalidate signal and PTE address are broadcast to all caches.

Regardless of which protocol is employed, the TLB snooping controller snoops the cache-memory interconnect and detects the update or invalidate signal and the PTE address. The TLB search engine searches the PTE address tag of the TLB table for the PTE address. If the PTE address is found in the TLB table, the associated translation is updated or invalidated by the TLB updating module. Thus, when the operating system changes a page table entry, translations in TLBs are automatically kept consistent.

The present invention can be implemented on any computer system that employs virtual memory. Thus, the present invention can be implemented in both uni-processor environments and multiple processor environments. The present invention is especially useful in shared memory, multi-processor systems where page migration occurs. Shared memory systems that benefit from the present invention include centralized shared memory systems, such as, symmetric multiple processor (SMP) systems and distributed shared memory (DSM) systems. The present invention can be employed to maintain consistency for any number of TLBs in a system.

By updating TLBs via hardware, communication overhead and costly operating system interrupts, that would otherwise occur with a software-based TLB update technique, are avoided.

Further features and advantages of the present invention, as well as the structure and operation of various embodiments of the present invention, are described in detail below with reference to the following drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

The present invention is described with reference to the accompanying figures, wherein:

FIG. 10 is a process flowchart illustrating a method for updating page table entries in TLBs when an operating system changes a page table entry.

In the drawings, like reference numbers typically indicate identical or finctionally similar elements. Additionally, the left-most digit(s) of a reference number typically identifies the drawing in which the reference number first appears.

DETAILED DESCRIPTION OF THE PREFERRED EMBODIMENTS

Table of Contents

1. Overview
2. Example Embodiment
3. Virtual Memory Mapping and TLB Consistency
4. System and Method for Maintaining TLB Consistency
5. Conclusions

1. Overview

In conventional computer systems, virtual memory address-to-physical address translations are typically stored in a page table entry of a page table. Each page table entry has a page table entry (PTE) address. Copies of page table entries, or translations stored therein, can be cached in a processor cache and can be placed in translational look-aside buffers (TLBs) that are coupled to CPUs.

The present invention is a hardware-based system and method for maintaining consistency between virtual memory address translations that are stored in a TLB with virtual memory address translations that are stored in a memory. More specifically, the present invention updates, or invalidates, translations in TLBs when an operating system changes a translation in a PTE.

2. Example Embodiment

The present invention can be implemented in any computer system that employs a virtual memory scheme. Thus, the present invention can be implemented in a variety of computer systems and environments, including, but not limited to, uni-processor computer systems, shared memory, symmetric multi-processing (SMP) systems and distributed shared memory (DSM) multi-processor systems. For example, the present invention can be implemented in an Origin™ scalable, distributed shared-memory multi-processor platform, manufactured by Silicon Graphics, Inc., Mountain View, Calif. Brief descriptions of uni-processor systems, SMP systems and DSM systems are provided below. These examples are provided to assist in the description of the present invention, not to limit the present invention.

Figure 1:
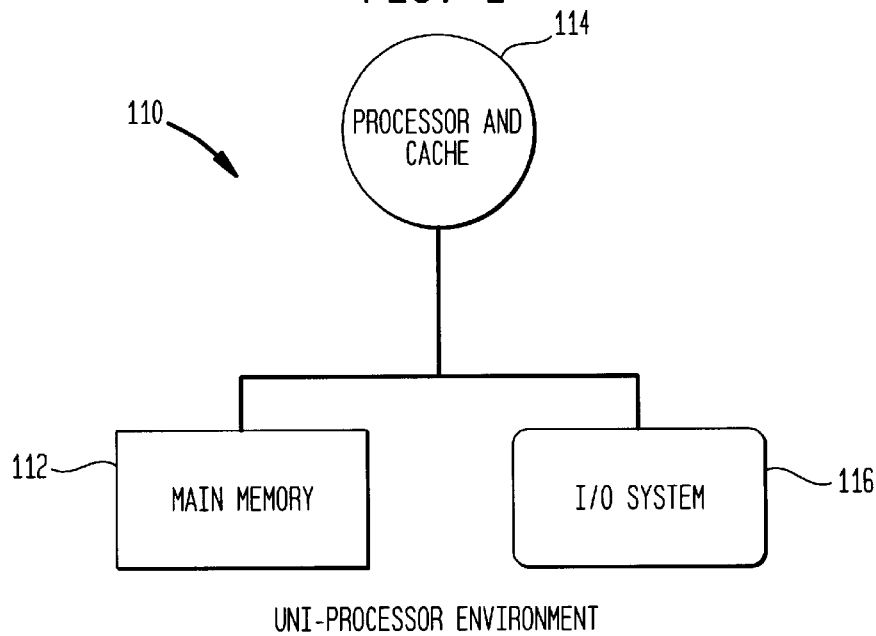
FIG. 1 is a block diagram of a uni-processor system that can employ the present invention.

Referring to FIG. 1, a uni-processor system 110 includes a single processor and cache node 114 coupled to a main memory 112. Main memory 112 stores data for use by processor and cache node 114. An input and output I/O system 116 provides interfacing to peripheral devices, such as, for example, user interfaces and memory devices which can include computer terminals and memory disks.

Figure 4:
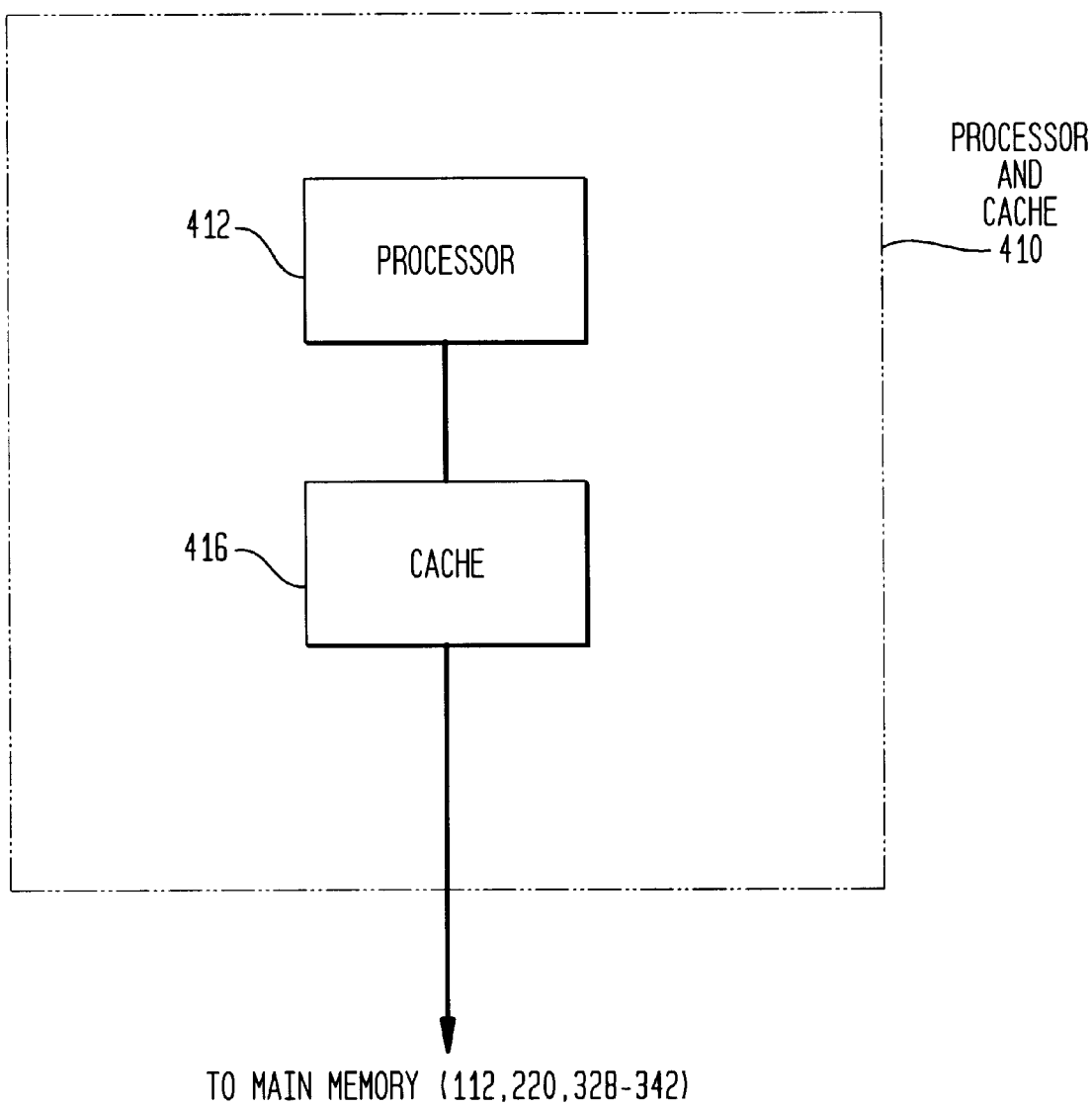
FIG. 4 is a block diagram of a processor and cache node that can be employed by any of the processor systems of FIGS. 1, 2 and 3.

Referring to FIG. 4, processor and cache node 114 can be implemented as processor and cache node 410. Processor and cache node 410 includes a processor 412 coupled to a main memory, which can be main memory 112, via a cache 416. For clarity, only a single processor 412 and cache memory 416 are shown. One skilled in the art will recognize that multiple processors and multiple levels of cache can be employed.

Cache 416 is provided for caching data retrieved from a main memory such as main memory 112. Once data is cached in cache 416, processor 412 can retrieve data from cache 416. Processor 412 can generally retrieve data from cache 416 faster than it can access data in main memory 112 because of the proximity of cache 416 to processor 412 and because the memory parts that are used to make cache 416 are faster than the memory parts that are used to make main memory. Cache 416 can include one or more levels of cache, as dictated by needs of users.

In operation, processor 412 processes threads for one or more processes. When processor 412 needs to access data stored in main memory 112, an access request is sent. If processor 412 is permitted access to the requested data, main memory 112 returns the requested data to cache 416. Once the requested data is stored in cache 416, processor 412 can access the data as necessary. In the future, processor 412 can access data in cache 416 without accessing main memory 112.

Figure 2:
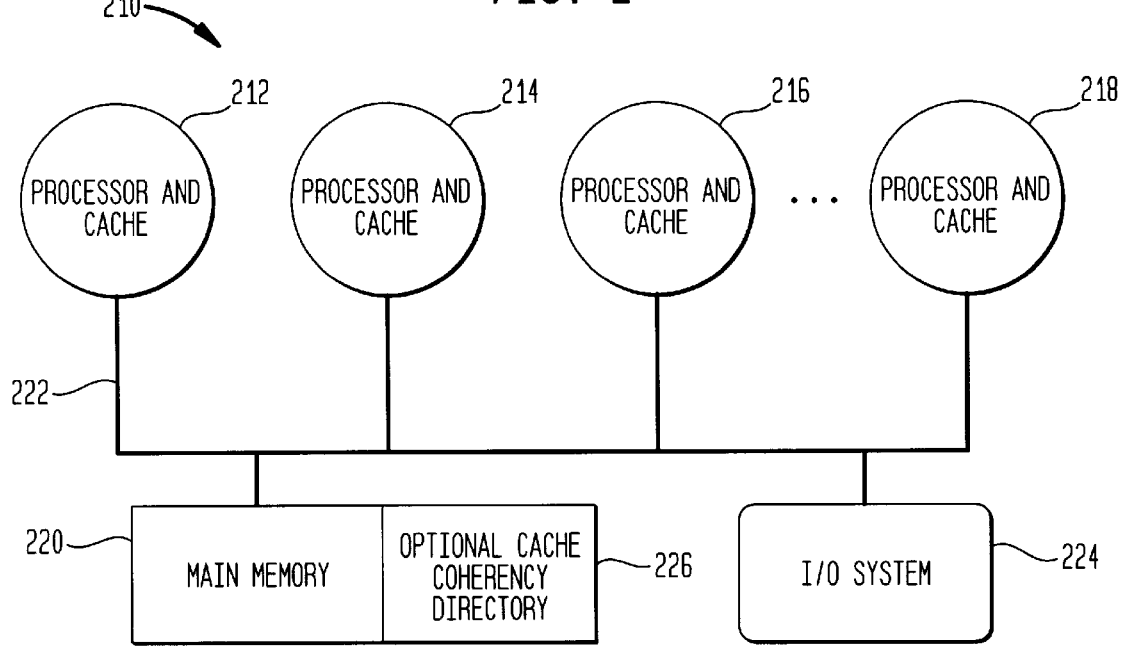
FIG. 2 is a block diagram of a symmetric, shared memory, multiprocessor (SMP) system that can employ the present invention.

Referring to FIG. 2, a centralized, shared memory, symmetric multi-processing (SMP) system 210 includes a plurality of processor and cache nodes 212–218. SMP 210 can include any number of nodes 212–218. Processor and cache nodes 212–218 are coupled to a centralized, shared, main memory 220 via a bus 222. An input/output I/O system 224 can be provided for interfacing SMP 210 with various external and peripheral devices, such as computer terminals and memory disks.

Processor and cache nodes 212–218 can be implemented, for example, as processor and cache node 410, in FIG. 4, described above. Alternatively, one or more processor and cache nodes 212–218 can employ a plurality of processors 412 and caches 416. In either implementation, SMP 210 permits multiple processors 412 to process a plurality of tasks in parallel. Centralized, shared memory 220 permits multiple processors 412 to share data between tasks.

Figure 3:
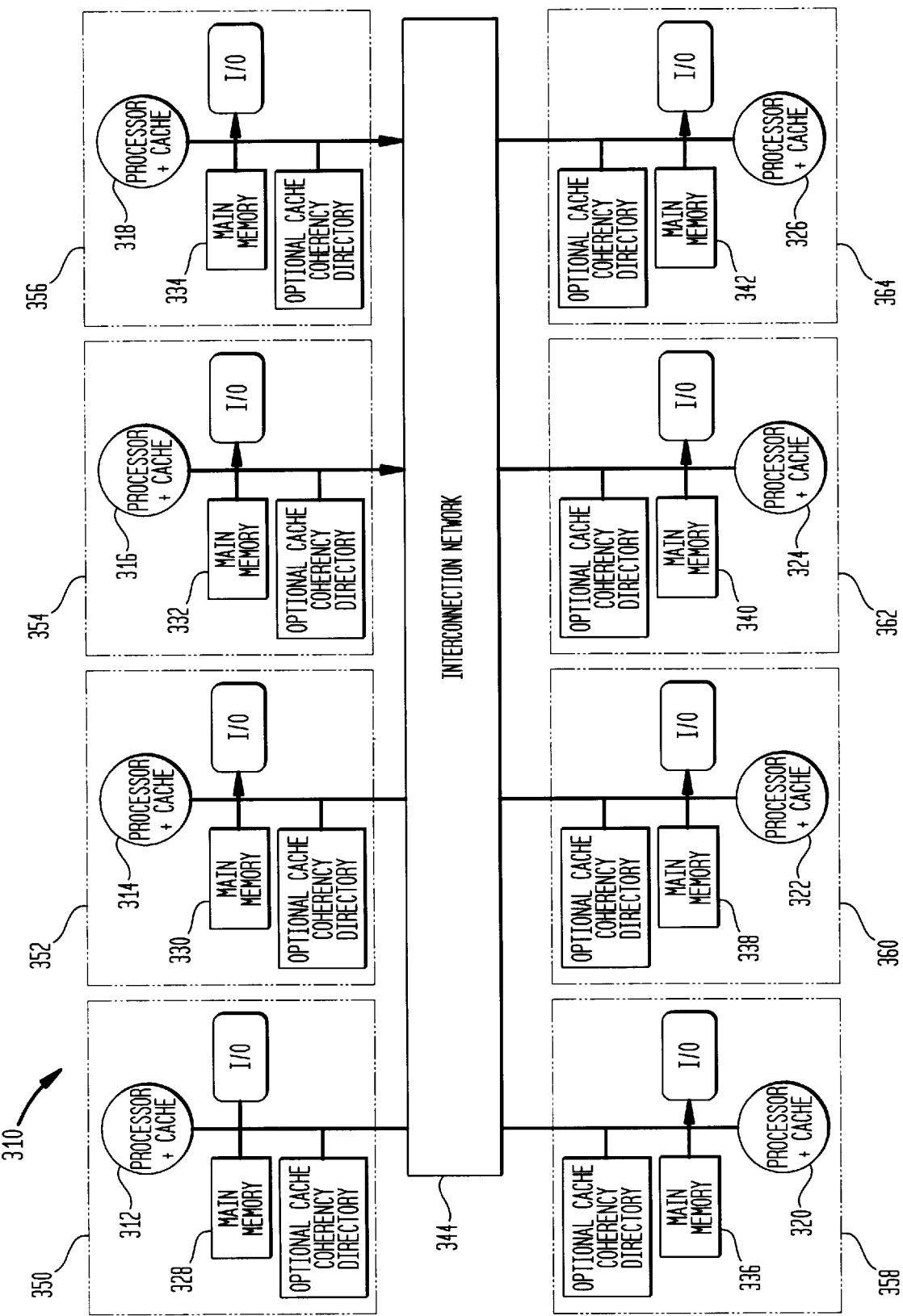
FIG. 3 is a block diagram of a distributed, shared memory (DSM) system that can employ the present invention.

Referring to FIG. 3, a distributed shared memory (DSM) system 310 includes a number of processing nodes 350–364, interconnected via an interconnection network 344. DSM 310 can include any number of processing nodes 350–364. Each processing node 350–364 is illustrated with a processor and cache node 312–326 and a portion of distributed shared memory 328–342. As would be apparent to a person skilled in the art, one or more of processing nodes 350–364 need not employ a processor and cache node.

Processor and cache nodes 312–326 can be implemented, for example, as processor and cache node 410 in FIG. 4, where each processor 412 accesses a portion of shared memory 328–342 through one or more levels of cache 416. Alternatively, one or more processor and cache nodes 312–326 can have a plurality of processors 412 and caches 416.

Distributed shared memory portions 328–342 are accessed by the processors within processing nodes 350–364 as if they formed a single continuous block of physical memory. As would be apparent to a person skilled in the art, one or more of processing nodes 350–364 need not employ a portion of shared memory.

In the example of FIG. 3, each processing node 350–364 is shown with an optional input/output (I/O) device. As would be apparent to a person skilled in the art, one or more of processing nodes 350–364 need not have an I/O device. Moreover, different types of I/O devices and combinations of external peripherals and resources can be used in a DSM system. Thus, one or more of processing nodes 350–364 can include any combination of processors or no processors, shared memory or no shared memory and I/O or no I/O.

In the example of FIG. 3, each processing node 350–364 is shown with an optional cache consistency directory. However, the present invention is not limited to directory-based cache consistency protocols. As would be apparent to one skilled in the art, a snooping protocol or any other hardware-based protocol or software-based cache consistency scheme can be employed.

By distributing physical or main memory 328–342 throughout DSM 310, each processing node 350–364 can include a portion of main memory. This physical proximity between processor and memory reduces memory latency with respect to the processor and memory within a processing node. DSM 310 is preferably configured so that data which is accessed most frequently by a particular processing node is placed in the portion of main memory within the processing node. If that data is subsequently accessed more frequently by a processor in another processing node, the data is migrated, or moved, to a portion of main memory within the other processing node.

Uni-processor systems, SMPs and DSMs, such as systems 110, 210 and 310 described with reference to FIGS. 1–3, are well known. Further details of such systems can be found in, for example, Hennessy and Patterson, *Computer Architecture A Quantitative Approach*, 2d Ed. (Morgan and Kaufmann Publ.: USA 1996), incorporated herein by reference.

3. Virtual Memory Mapping and TLB Consistency

Figure 5:
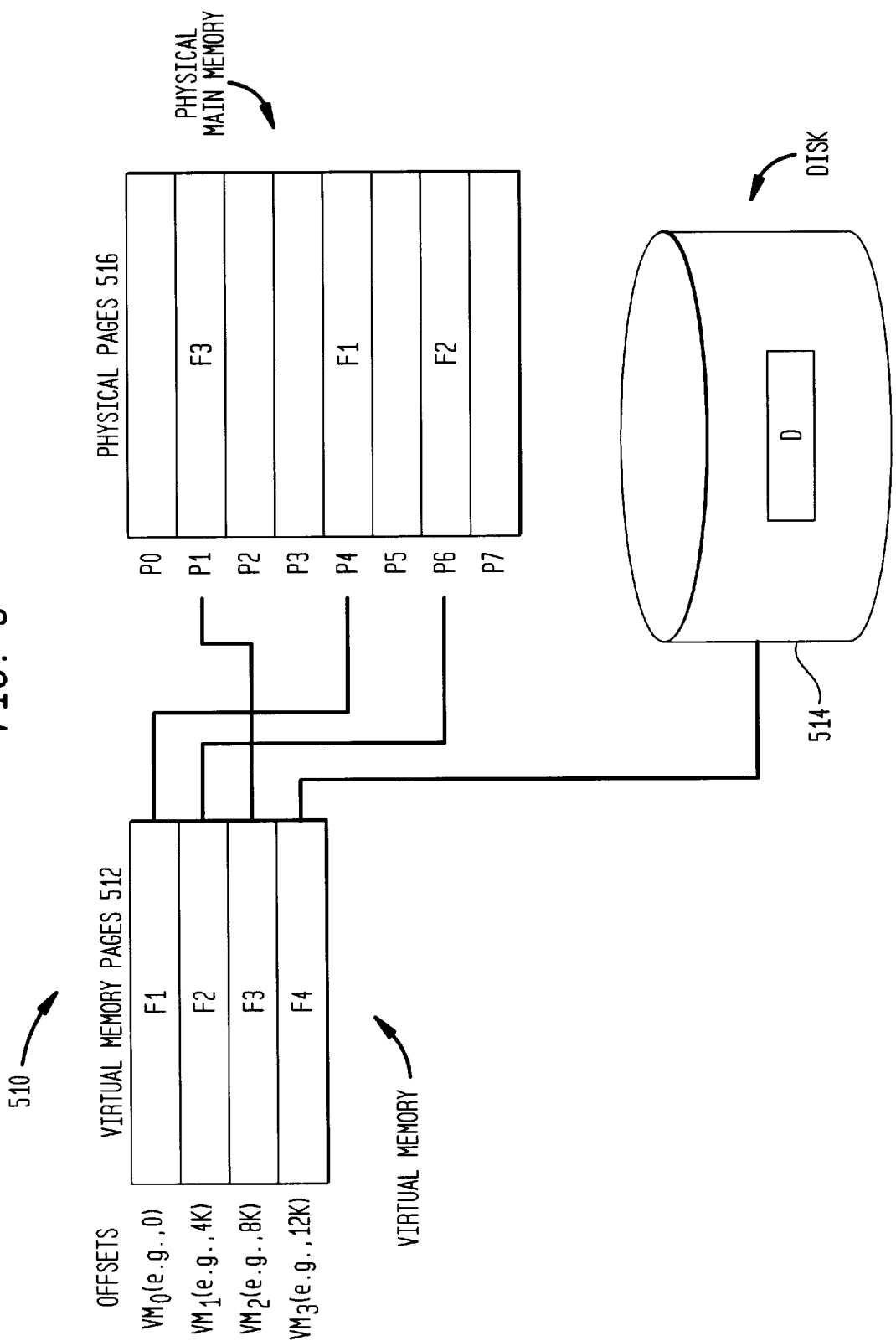
FIG. 5 is a block diagram of a virtual memory mapping scheme.

Referring to FIG. 5, a virtual memory address-to-physical main memory address translation scheme 510 is illustrated. Virtual memory pages 512 include virtual pages $F_1$, $F_2$, $F_3$ and $F_4$ Virtual pages $F_1$, $F_2$, $F_3$ and $F_4$ can be referenced by a relative offset that is typically based upon page size. For example, if an operating system employs 4K pages, page $F_1$ has an offset of zero since it is the first virtual page. Page $F_2$ has a virtual offset of 4K. Page $F_3$ has a virtual offset of 8K and page $F_4$ has a virtual offset of 12K. Virtual address spaces are usually much larger than the amount of physical memory in a system.

One or more of virtual pages $F_1$, $F_2$, $F_3$ and $F_4$ can be stored in physical page frames 516. Here, $F_1$ is stored at $P_4$, $F_2$ is stored at P6 and $F_3$ is stored at P1. F4 is not currently stored in page frames 516. A user that needs to access one or more of virtual pages $F_1$, $F_2$, $F_3$ or $F_4$ need to know if and where, in physical memory, the virtual page is stored.

A variety of schemes are available for providing virtual memory address-to-physical memory address translations. The most common scheme is a forward page table scheme.

Figure 6:
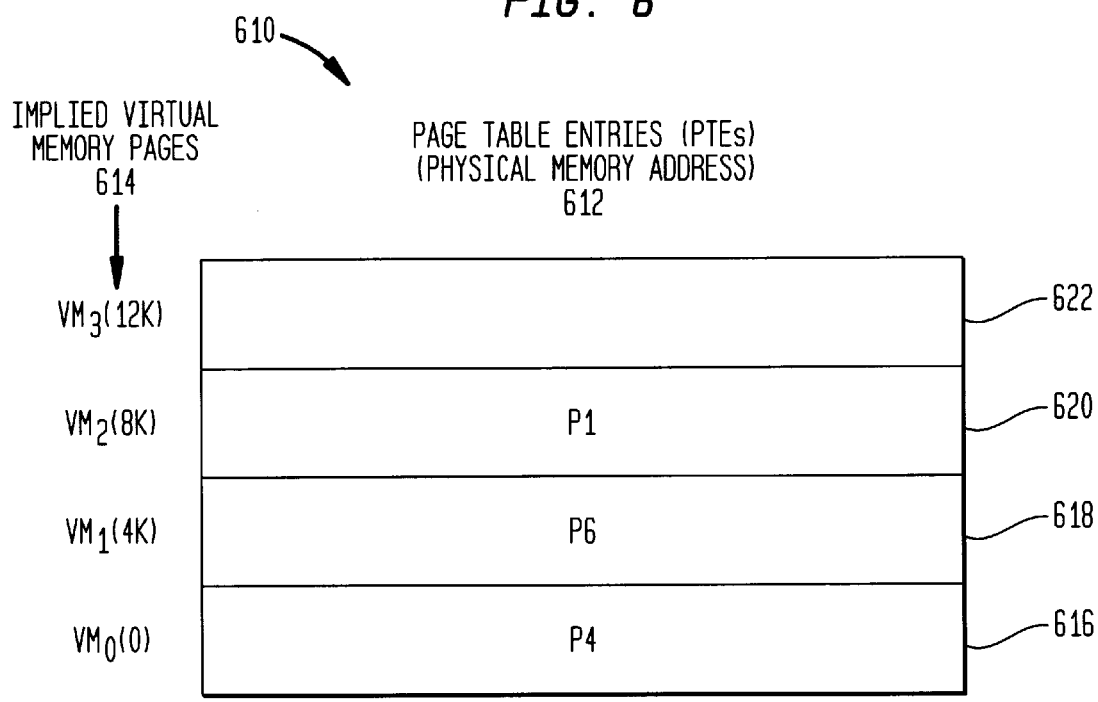
FIG. 6 is an illustration of a page table that can be employed by a virtual memory mapping scheme for storing virtual memory address-to-physical memory address translations.

Referring to FIG. 6, a forward page table 610 provides virtual memory address-to-physical memory address translations. Each user or application that is allotted a portion of physical memory can be provided with a separate page table 610. In some cases, page tables can be shared. Each page table 610 includes a set of page table entries (PTEs) 616–622 for storing physical addresses and control information such as a valid bit, permission bits, etc. A user or application that is running on a processor, such as processor 412 for example, can reference virtual pages $F_1$, $F_2$, $F_3$ and $F_4$ using their virtual memory addresses or offsets. A processor translates the virtual memory address to a physical memory address and accesses the physical memory location. PTEs 616–622 can also be referenced by a physical address at which each PTE is stored.

Virtual memory pages 614 can be referred to as implied virtual memory pages because page table 610 does not have to include specific virtual memory pages. Instead, the first PTE 616 is impliedly, or automatically, associated with the first virtual memory page. Similarly, the second PTE 618 is impliedly associated with the second virtual memory page.

Using the example from FIG. 5, the first virtual memory page F1 is stored in page P4. Thus, first PTE 616 references P4. Similarly, second virtual memory page F2 is stored in page P6 so the second PTE 618 references P6. Third virtual memory page F3 is stored in page P1 so third PTE 620 references P1. Since fourth virtual memory page F4 is not stored in physical memory, fourth PTE 622 does not reference any page of physical memory. Thus, a reference F4 will result in a page table miss or page fault and F4 will have to be retrieved from disk 514.

Another way of describing page table 610 is as an array that is indexed by the virtual page number of the desired mapping. For example, if virtual address is 0×10000 and the page size of a system is 4K bytes (i.e., 0×1000 bytes), then the virtual page number is the virtual address divided by the page size, or 0×10. The PTE for page 0×10 can be found by simply looking at index 0×10 in the page table array. The starting address of the array itself is maintained by the operating system in such a way that it is easy to find. Alternatively, the work can be done in hardware where the base address of the page table array is loaded into a special hardware register inside a translational look-aside buffer (TLB). TLBs are discussed more fully below.

Virtual address spaces are usually much larger than the amount of physical memory in a system. Thus, forward page tables, such as page table 610, are usually implemented as sparse arrays.

The array implementation of a page table illustrated in FIG. 6 is just one possible data structure for translating virtual memory addresses to physical memory addresses. As would be apparent to one skilled in the art, other data structures can be employed. For example, a reverse page table can be employed where the number of page table entries equals the number of virtual pages that are stored in physical memory. When a translation is needed, the page table is searched for an entry that is tagged with the virtual address that is needed. Reverse page tables are typically implemented with a hash table.

Additional details of virtual memory management can be found in, for example: Schimmel, "*UNIX Systems for Modern Architectures, Symmetric Multiprocessing and Caching for Kernel Programmers*," pp.7–8; and Goodheart and Cox, "*The Magic Garden Explained*," pp. 69–140, Prentice Hall, 1994, incorporated herein by reference.

In systems 110 and 210, page tables 610 are typically stored in main memory 112 and 220 portion respectively. In DSM 310, each page table 610 is preferably stored in a main memory portion 328–342 that is associated with a processor and cache node 312–326 on which an associated user is running. Page tables can also be cached in cache 416.

Figure 7:
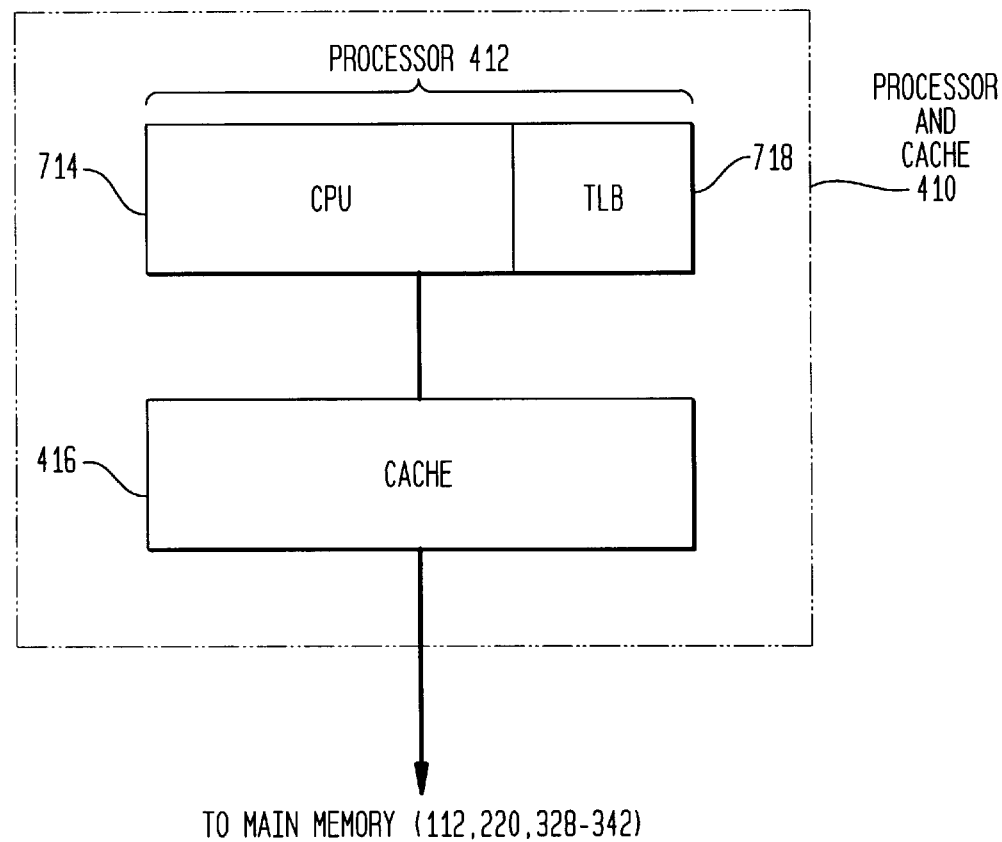
FIG. 7 is a block diagram of the processor and cache node illustrated in FIG. 4, including a CPU and a translational look-aside buffer (TLB) for storing virtual memory address-to-physical memory address translations.

Page table entries can be placed in one or more translational look-aside buffers. For example, referring to FIG. 7, processor and cache node 410 is provided in greater detail wherein processor 412 includes a central processing unit (CPU) 714 and a translational look-aside buffer (TLB) 718. TLB 718 is a relatively small, and typically on-chip, memory device that is used for storing a small number of most recently used virtual memory address-to-physical memory address translations. Because TLB 718 is small and typically on-chip, CPU 714 can quickly search and retrieve address translations from TLB 718.

When CPU 714 retrieves a translation from a main memory, such as main memories 112, 220 or 328–342, the translation is stored in cache 416. A copy of the translation is also placed in TLB 718. Later, when CPU 714 requires a translation, CPU 714 or an operating system searches TLB 718. If the translation is not found in TLB 718 (i.e., a TLB "miss"), the desired translation can be loaded from the page tables in memory by hardware, software, firmware, or any combination thereof.

For example, many Reduced Instruction Set (RISC) processors, such as MIPS processors from Silicon Graphics, Inc., handle TLB misses through software. More traditional CISC processors, such as Motorola Corporation's 68000 line, handle TLB misses with hardware.

While TLB 718 can provide translations to CPU 714 faster than cache 416 can to computer systems, TLB 718 introduces consistency problems. For example, if a translation from page table 610 is cached in cache 416 and in TLB 718, and if the page table entry is changed, the translation in cache 416 and TLB 718 must both be updated. Updating can include replacing an invalid translation with a valid translation or simply identifying the invalid translation as invalid.

A variety of systems and methods can be employed for maintaining consistency between translations stored in page table 610 in main memories 112, 220, 328–342 and translations that are cached in nodes such as nodes 114, 212–218 and 312–326.

Consistency of TLB 718, however, cannot be maintained with existing cache consistency systems and methods. This is because, in existing systems, TLB 718 can only be accessed by CPU 714 or by the operating system. For example, stale TLB entries are typically removed by broadcasting invalidation requests to all central processing units (CPUs) in a system via inter-CPU interrupts and then waiting for acknowledgments to come back from each CPU. Interrupting the operating system or the CPU each time that a TLB entry needs to be invalidated, however, reduces the time that can be spent performing other tasks.

Alternatively, TLB invalidation requests are sent only to CPUs where the process has executed. In either situation, substantial communication and synchronization overhead is incurred. Moreover, operating systems can invalidate every entry in a TLB rather than just the stale entries. This results in additional TLB miss overhead for the entries that were valid. Thus, whenever a translation in TLB 718 is to be invalidated, CPU 714 or the operating system must be interrupted in order to execute the invalidation.

4. System and Method for Maintaining TLB Consistency

Figure 8:
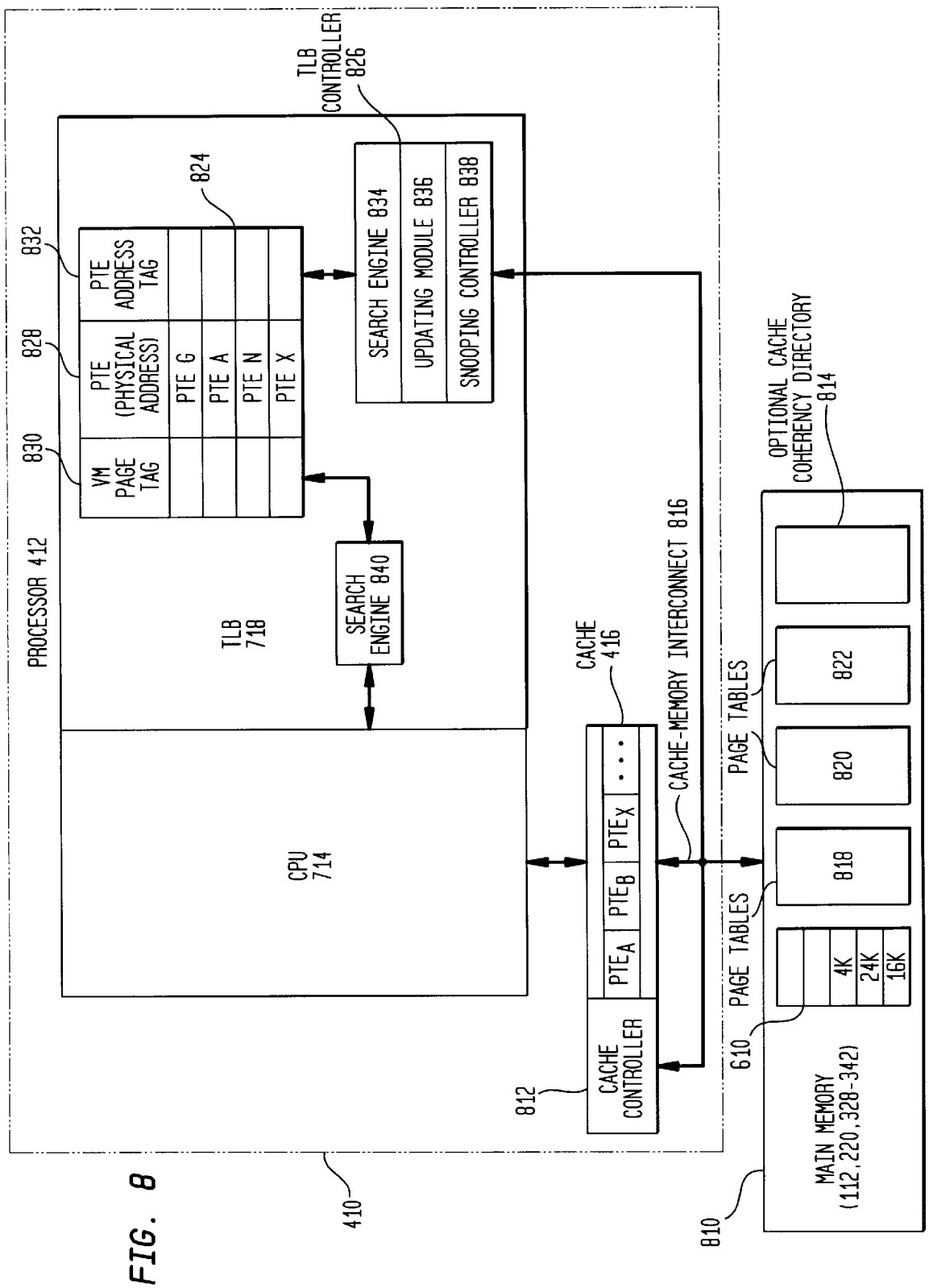
FIG. 8 is a detailed block diagram of the processor and cache node illustrated in FIG. 7, including details of a TLB in accordance with the present invention.

Referring to FIG. 8, a hardware-based system and method for updating a TLB when an operating system changes a PTE, without interrupting an associated CPU or the operating system, is illustrated as implemented in processor and cache node 410. Processor and cache node 410 is coupled to a main memory 810 which can be main memory 112, 220, or 328–342, depending upon whether node 410 is implemented in a uni-processor environment, an SMP environment, or a DSM environment. Cache 416 can include a cache controller 812 for controlling the contents of cache 416.

Cache consistency can be maintained between data cached in cache 416 -and data stored in main memory 810 by a variety of consistency techniques. For example, cache consistency can be maintained with an optional cache consistency directory 814 in main memory 810. Alternatively, cache consistency can be maintained by a snooping protocol implemented within cache controller 812 which snoops bus 816 for broadcast messages.

Any number of page tables, such as, for example, page tables 610, 818, 820 and 822 can be provided for storing virtual memory address-to-physical memory address translations. Alternatively, reverse page tables or any other suitable mechanism can be employed for storing virtual memory address-to-physical memory address translations.

When a virtual memory address-to-physical memory address translation is retrieved by a processor and cache node 410 from any of the page tables 610, 818–822, the translation is cached in cache 416, like any other memory access. The translation is also sent to CPU 714 so that it can access main memory 810, using the physical memory address. When CPU 714 receives a translation from any of page tables 610, 818–822, CPU 714 preferably stores the translation in TLB 718 for future use. Note that when an operation is described as being performed by a CPU, such as CPU 714, the operation can be performed solely by the CPU, solely by an operating system (not shown) that controls the CPU or by a combination of the CPU and the operating system.

TLB 718 includes a TLB table 824 for storing a list 828 of virtual memory-to-physical memory address translations, or PTEs. PTE list 828 is indexed by a virtual memory (VM) address tags 830. VM address tags 830 can be searched by search engine 840. TLB table 824 also includes PTE address tags 824 for indexing PTE in PTE list 828. The purpose of PTE address tags 824 are discussed below.

When CPU 714 needs to access a virtual memory address, CPU 714 first searches VM address tags 830, using search engine 840. If the requested virtual memory is found in VM address tags 830, the PTE that is associated with the VM address tag, or the physical address therein, is retrieved from PTE list 828. The retrieved PTE, or physical address therein, is used to access a physical page of main memory 810.

If the requested virtual memory address is not found in VM address tag 830, CPU 714 computes the page table entry address and looks in the cache 416 or main memory 810 for the computed address. If the page table entry address in main memory 810 does not store a valid physical address, the system will have to access an external memory device, such as disk drive 514, via an I/O interface such as IO system 116 or 224 to retrieve the data. After the data is brought into main memory 810, an appropriate PTE is updated with the physical address of the data. The PTE and the PTE address is sent to processor and cache node 410 and stored in cache 416.

The PTE and PTE address are also sent to TLB 718 where they are placed in PTE list 828 and PTE address tag 832, respectively, and associated with a virtual memory tag 830.

TLB 718 also includes a TLB controller 826 for detecting changes to PTEs and for updating PTEs in PTE list 828 when PTE changes are detected. TLB controller 826 includes a snooping controller 838 for detecting activity on cache-memory interconnect 816 that affects PTEs. Snooping controller 838 can be analogous to snooping protocols employed by cache controllers. As would be apparent to one skilled in the art given this description, snooping controller 838 can employ a variety of snooping protocols.

Snooping controller 838 constantly snoops cache-memory interconnect 816 for cache consistency data. Snooping controller 838 detects PTE changes on cache-memory interconnect 816 regardless of whether a snooping protocol or directory protocol is employed for maintaining consistency between cache 416 and main memory 810. This is because cached consistency data is present on cache-memory interconnect 816 either as a broadcast, in a snooping protocol based system, or as an instruction sent directly from directory cache consistency directory 814, in a directory-based protocol.

TLB controller 826 includes a search engine 834 for searching TLB table PTE address tags 832 and an updating module 836 for updating or invalidating PTEs in PTE list 828. When snooping controller 838 detects activity on cache-memory interconnect 816 that affects a PTE, search engine 834 searches PTE address tags 824 for the PTE address that was detected by snooping controller 838. If search engine 834 finds the PTE address tag in column 832, updating module 836 updates or invalidates the associated PTE.

Figure 9:
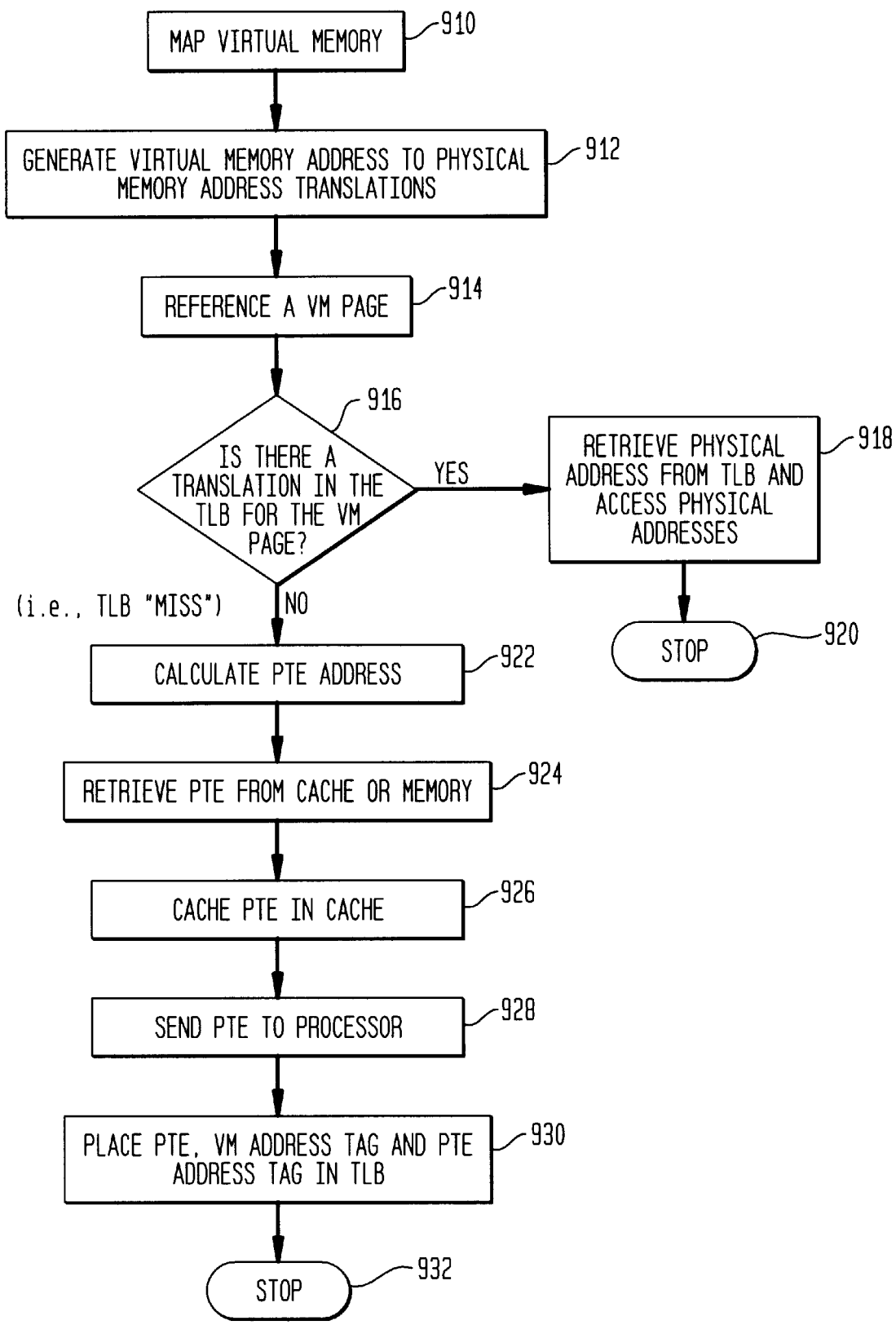
FIG. 9 is a process flowchart illustrating a method for placing page table entries, virtual memory page tags and page table entry address tags in a TLB.

Referring to the process flowcharts of FIG. 9, a preferred method for storing PTE data in TLBs is illustrated. In FIG. 10, a preferred method for updating or invalidating PTE data in TLBs, when an operating system changes a PTE, is provided. The process flowcharts of FIGS. 9 and 10 are described with reference to FIG. 8, where TLB table 824 and TLB controller 826 are implemented in processor and cache node 410. It is to be understood, however, that the present invention is not limited to implementation in processor and cache node 410. The present invention can be practiced in any processor system which employs a virtual memory scheme, regardless of whether a cache system is employed. Moreover, the present invention can be implemented for any number of processors and TLBs in a processing system.

The process of placing PTE data in TLBs begins at step 910, where data is mapped into main memory such as main memory 810, according to any virtual memory mapping scheme. For example, an operating system that controls processor and cache node 410 can map virtual memory, as discussed above in FIGS. 5 and 6, where virtual memory addresses 512 are mapped to physical addresses 516. Main memory 810 can represent main memory 112 in uniprocessor system 110, main memory 220 in SMP 210 or main memory 328–342 in DSM 310.

In step 912, the operating system generates virtual memory address-to-physical memory address translations for the mapped data. For example, a page table, such as page table 610 can be generated for a process that is provided with mapped memory. The page table can be for the exclusive use of one user or can be shared by multiple users. Page table 610 represents a variety of methods that can be employed for providing virtual memory address-to-physical memory address translations.

The generated page table is preferably stored in main memory 810. Thus in uni-processor system 110, the page table is preferably stored in main memory 112. In SMP 210, the page table is stored in main memory 220. In DSM 310, the page table can be stored in any portion of main memory 328–342. Preferably, the page table is stored in a portion of main memory 328–342 that is adjacent to a processor on which an associated application or user is running. Generation and storage of page tables is typically handled by the operating system.

In step 914, virtual memory address-to-physical memory address translations, such as those in page tables 610, 818, 820 and 822 are available for use by processors, such as processor 412 and/or the operating system. Thus, in step 914, when processor 412 needs to access mapped data, it references a virtual memory page.

In step 916, processor 412 uses search engine 840 to search for the referenced virtual memory page in VM page tags 830. If the virtual memory page tag is found in column 830, processing proceeds to step 918 where the a translation, or physical address, is retrieved an associated PTE in PTE list 828. The physical address can be used to access the page of memory. Processing then stops at step 920.

In step 916, if the referenced virtual page is not found in VM page tags 830 (i.e., a TLB "miss"), processing proceeds to step 922 where a PTE address is calculated for the referenced VM page.

In step 924, the calculated PTE address is used to retrieve the PTE from cache 416, if it is stored there, or from main memory 810. If the referenced VM page is not in memory 810, it is brought into memory 810 and a PTE at the calculated PTE address is updated accordingly.

In step 926, the PTE and PTE address is sent from main memory 810 to cache 416 on cache-memory interconnect 816, under control of the operating system and/or a memory controller. The data is received by, and cached in, cache 416.

In step 928, the PTE, or the virtual memory address-to-physical memory address translation that is stored therein, is sent to processor 412. When the PTE or translation is retrieved by processor 412, CPU 714 within processor 412 can use the translation to access data in physical memory.

In step 930, the PTE, or the translation, is placed in TLB table 824. More specifically, the PTE, or portions thereof, are placed in PTE list 828, a virtual memory page tag that is associated with the PTE is placed in VM page tags 830 and the PTE address is placed in PTE address tags 832. Step 930 can be performed by CPU 714, by the operating system, by TLB controller 826, or any combination thereof. Processing stops at step 932. Steps 910–932 can be repeated, in whole or in part, as necessary for any number of processes, processors, TLBs and computer systems.

Referring to FIG. 10, a preferred method for updating TLB entries when a PTE entry is changed by the operating system, is illustrated. The process begins at step 1010, where a page table entry is changed. Page table entries can change for a variety of reasons. For example, referring to FIG. 5, a page table entry can change if a memory management scheme associated with main memories 810 re-maps, migrates or pages-out a page of data. The associated page table entry is changed to reflect the new physical address of the mapped data. This can occur, for example, where a mapped page of physical memory location is needed for some other use.

When a page table entry is changed, or deleted, any copies that are cached in cache 416 or in TLB 718 must be invalidated and/or updated. Thus, in step 1012, a cached copy of the PTE is updated or invalidated. For example, a command can be sent on cache-memory interconnect 816 to invalidate a copy of the PTE in cache 416. The command can be sent as part of a hardware-based cache consistency protocol, such as a directory-based protocol or a snooping protocol, or as part of a software-based cache consistency protocol.

For example, where a directory based cache consistency scheme is employed, a consistency directory, such as directory 814, records where data from memory 810 is cached. If action is taken on data within main memory 810, directory 814 is checked to determine whether the data is cached. If the data is cached, an invalidate command is sent to each cache that caches the data. Thus, if the data is cached in cache 416, an invalidate signal is sent to cache 416 via cache-memory interconnect 816. The invalidate signal includes data for identifying the physical address in memory 810 that stores the data that has changed. If the changed data is a PTE, the invalidate signal will identify the page table entry address of the PTE.

In a snooping-based cache consistency scheme, an invalidate signal is broadcast to all caches in the system. Thus, in a snooping protocol, all invalidate signals are detectable on cache-memory interconnect 816.

Cache 416 can employ a cache controller 812 for receiving the invalidate signal and address identification data. Cache controller 812 locates the data in cache 416 and sets an invalid bit for that data or otherwise marks it as invalid. Alternatively, instead of simply invalidating the cached translation in cache 416, main memory 810 could send an updated or current PTE, if one exists, to cache 416.

In step 1014, TLB snooping controller 838 constantly snoops cache-memory interconnect 816 for activity that might affect translations in TLB table 824. TLB snooping controller 838 can detect invalidate signals and addresses on cache-memory interconnect 816, regardless of whether the signals are sent from a directory based consistency scheme or a snooping based scheme.

In step 1016, when TLB controller 826 detects activity that might affect translations in TLB table 824, search engine 834 searches PTE address tag 832 to determine whether an address that is detected on cache-memory interconnect 816 matches a PTE address tag in column 832.

In step 1018, TLB controller 826 determines whether an address that is detected on cache-memory interconnect 816 is in PTE address tag 832. If not, no further action is taken by TLB controller 826 and processing stops in step 1020.

In step 1018, if the detected address is found in PTE address tag 832, processing proceeds to step 1022, where TLB controller updating module 836 updates a corresponding PTE in list 828. Updating module 836 can, for example, set an invalid bit for the PTE in list 828 that is associated with the PTE address. Thereafter, when CPU 714 uses search engine 840 to search VM page tag 830 for a virtual memory page that has an invalid bit set, CPU 714 will look to cache 418 or main memory 810 for a valid PTE at the PTE address.

Alternatively, where the cache consistency scheme employed by cache 416 replaces invalid PTEs with valid PTEs, TLB updating module 836 preferably updates TLB list 828 with a valid PTE for the detected PTE address.

After the PTE is invalidated or updated, processing stops at step 1026. TLB controller 826, in conjunction with PTE address tag 832, thus provides a system and method for updating TLB 718 when a PTE is changed by the operating system, without interrupting CPU 714 or the operating system. This frees CPU 714 to process other tasks.

5. Conclusions

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for updating virtual memory address-to-physical memory address translations for a computer system, comprising:
    a central processing unit;
    a cache memory coupled to said central processing unit;
    a translational look-aside buffer (TLB) table coupled to the central processing unit, said TLB table having:
        a page table entry field for storing a list of page table entries, each page table entry identifying a page of physical memory that stores a virtual memory page,
        a virtual memory address tag field for storing a list of virtual memory address tags, each virtual memory address tag associating a virtual memory address with each page table entry in said page table entry field, and
        a page table entry address tag field for storing a list of page table entry address tags, each page table entry address tag associating a page table entry address with each page table entry in said page table entry field; and
    a TLB controller that updates said TLB table without broadcast instructions by an operating system, said TLB controller having:
        a snooping controller that snoops a cache-memory interconnect for page table entry addresses and for an indication that a page table entry in said cache memory has changed,
        a search engine that searches said page table entry address tag in said TLB table for a snooped page table entry address when said snooping controller detects that a page table entry has changed, and
        an updating module that updates a page table entry in said TLB table that is associated with the snooped page table entry address.

2. The system according to claim 1, wherein said updating module comprises a module that invalidates a translation in said TLB table by changing the state of a valid bit.

3. The system according to claim 1, wherein said updating module comprises a module that replaces an invalid translation in said TLB table with a valid translation.

4. A translational look-aside buffer (TLB), comprising:
    a TLB table having:
        a page table entry field for storing a list of page table entries, each page table entry identifying a page of physical memory that stores a virtual memory page,
        a virtual memory address tag field for storing a list of virtual memory address tags, each virtual memory address tag associating a virtual memory address with each page table entry in said page table entry field, and
        a page table entry address tag field for storing a list of page table entry address tags, each page table entry address tag associating a page table entry address with each page table entry in said page table entry field;
    a snooping controller that snoops a cache-memory interconnect for page table entry addresses and for an indication that a page table entry in said cache memory has changed;

a search engine, coupled to said snooping controller, that searches said page table entry address tag in said TLB table for a snooped page table entry address when said snooping controller detects that a page table entry has changed; and an updating module, coupled to said search engine and to said TLB table, that updates a page table entry in said TLB table that is associated with the snooped page table entry address.

5. The system according to claim 4, wherein said updating module comprises a module that invalidates a translation in said TLB table by changing the state of a valid bit.

6. The system according to claim 4, wherein said updating module comprises a module that invalidates less than all translations in said TLB table.

7. The system according to claim 4, wherein said updating module comprises a module that replaces an invalid translation in said TLB table with a valid translation.

8. A method for maintaining consistency of a translational look-aside buffer (TLB), comprising the steps of:

(1) storing information in a TLB coupled to a central processing unit, said TLB having:
 a page table entry field for storing a list of page table entries, each page table entry identifying a page of physical memory that stores a virtual memory page,
 a virtual memory address tag field for storing a list of virtual memory address tags, each virtual memory address tag associating a virtual memory address with each page table entry in said page table entry field, and
 a page table entry address tag field for storing a list of page table entry address tags, each page table entry address tag associating a page table entry address with each page table entry in said page table entry field;

(2) snooping a cache-memory interconnect for a page table entry address and for an indication that a page table entry associated with the page table entry address has changed;

(3) searching the TLB for the page table entry address when it has been determined in step (2) that a page table entry has changed; and (4) updating a page table entry associated with the changed page table address when the TLB includes the page table entry address.

9. The method according to claim 8, wherein step (1) comprises snooping a cache-memory interconnect of a directory-based cache consistency system.

10. The method according to claim 8, wherein step (1) comprises snooping a cache-memory interconnect of a snooping-based cache consistency system.

11. The method according to claim 8, wherein step (3) comprises updating the page table entry without interrupting a central processing unit associated with the TLB.

12. The method according to claim 8, wherein step (3) comprises updating the page table entry without intervention by an operating system.

13. The method according to claim 8, wherein step (3) comprises updating the page table entry without software intervention.

14. The method according to claim 8, wherein step (3) comprises updating the page table entry when data migrates to another memory location.

15. The method according to claim 8, wherein step (3) comprises invalidating a translation in the TLB table.

16. The method according to claim 8, wherein step (3) comprises invalidating less than all translations in the TLB table.

17. The method according to claim 8, wherein step (3) comprises replacing an invalid with a valid translation.

18. A computer system comprising:

at least one processor having at least one translational look-aside buffer (TLB), said TLB including:
 a TLB table having:
  a page table entry field for storing a list of page table entries, each page table entry identifying a page of physical memory that stores a virtual memory page,
  a virtual memory address tag field for storing a list of virtual memory address tags, each virtual memory address tag associating a virtual memory address with each page table entry in said page table entry field, and
  a page table entry address tag field for storing a list of page table entry address tags, each page table entry address tag associating a page table entry address with each page table entry in said page table entry field,
 a snooping controller that snoops a cache-memory interconnect for page table entry addresses and for an indication that a page table entry in said cache memory has changed,
 a search engines coupled to said snooping controller, that searches said page table entry address tag in said TLB table for a snooped page table entry address when said snooping controller detects that a page table entry has changed, and
 an updating module, coupled to said search engine and to said TLB table, that updates a page table entry in said TLB table that is associated with the snooped page table entry address.

19. The computer system according to claim 18, wherein said updating module comprises a module that replaces an invalid translation with a valid translation.

20. The computer system according to claim 18, wherein said updating module comprises a module that invalidates a translation in said TLB table by changing the state of a valid bit.

21. The computer system according to claim 18, wherein said updating module comprises a module that invalidates less than all of the translations in said TLB table.

* * * * *

UNITED STATES PATENT AND TRADEMARK OFFICE
CERTIFICATE OF CORRECTION

PATENT NO.   : 6,105,113
DATED        : August 15, 2000
INVENTOR(S)  : Curt F. Schimmel It is certified that error appears in the above-identified patent and that said Letters Patent is hereby corrected as shown below:

Column 3,
Lines 55-56, please replace "The after the word "The" and before the can" with -- The TLB controller can --.

Column 15,
Line 47, please replace the "(1)" in claim 9 with -- (2) --.
Line 50, please replace the "(1)" in claim 10 with -- (2) --.
Line 53, please replace the "(3)" in claim 11 with -- (4) --.
Line 56, please replace the "(3)" in claim 12 with -- (4) --.

Column 16,
Line 1, please replace the "(3)" in claim 13 with -- (4) --.
Line 4, please replace the "(3)" in claim 14 with -- (4) --.
Line 7, please replace the "(3)" in claim 15 with -- (4) --.
Line 9, please replace the "(3)" in claim 16 with -- (4) --.
Line 13, please replace the "(3)" in claim 17 with -- (4) --.
Line 38, please replace "engines" in claim 18 with -- engine, --.

Signed and Sealed this

Eighteenth Day of December, 2001

*Attest:*

*Attesting Officer*

JAMES E. ROGAN
*Director of the United States Patent and Trademark Office*